United States Patent

[11] 3,596,505

| [72] | Inventor | Milton F. Zeutschel<br>Bellevue, Wash. |
|---|---|---|
| [21] | Appl. No. | 836,002 |
| [22] | Filed | June 24, 1969 |
| [45] | Patented | Aug. 3, 1971 |
| [73] | Assignee | Automation Industries Inc.<br>Los Angeles, Calif. |

[54] ULTRASONIC SEARCH UNIT WITH RADIAL MODE MOTION TRANSDUCER
11 Claims, 6 Drawing Figs.

[52] U.S. Cl. ..................................... 73/71.5, 73/67.7
[51] Int. Cl. ...................................... G01n 24/04
[50] Field of Search ............................ 73/71.5

[56] References Cited
UNITED STATES PATENTS

| 2,458,771 | 1/1949 | Firestone ................. | 73/67.8 X |
| 2,672,392 | 3/1954 | Caples et al. ............. | 73/67.8 X |
| 3,242,723 | 3/1966 | Evans ..................... | 73/71.5 |
| 3,503,252 | 3/1970 | Miller .................... | 73/71.5 |

FOREIGN PATENTS

| 255,105 | 2/1963 | Australia ................. | 73/71.5 |

*Primary Examiner*—Richard C. Queisser
*Assistant Examiner*—Arthur E. Korkosz
*Attorney*—Dan R. Sadler ABSTRACT: An ultrasonic search unit and a nondestructive material tester are described. The search unit comprises a housing generally formed of a relatively dense material, one end of which is hollow. An insert is securely connected over the hollow end. The insert has a relatively thick outer portion and a relatively thinner diaphragm portion. A transducer crystal is secured to the thick outer portion of the insert and is capable of being vibrated in the radial mode when excited with electrical energy. A contactor is secured to the diaphragm and adapted to be coupled to the workpiece under test.

PATENTED AUG 3 1971 3,596,505
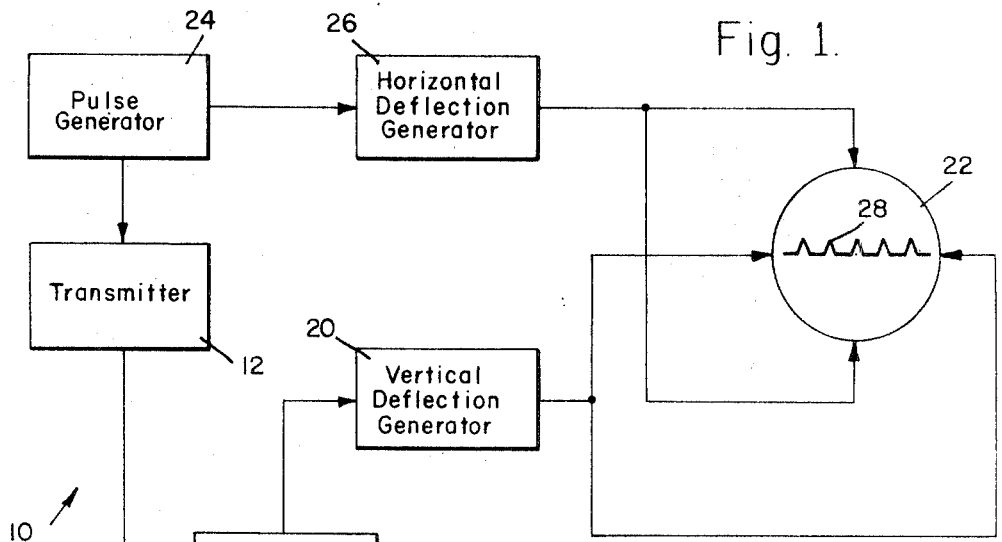
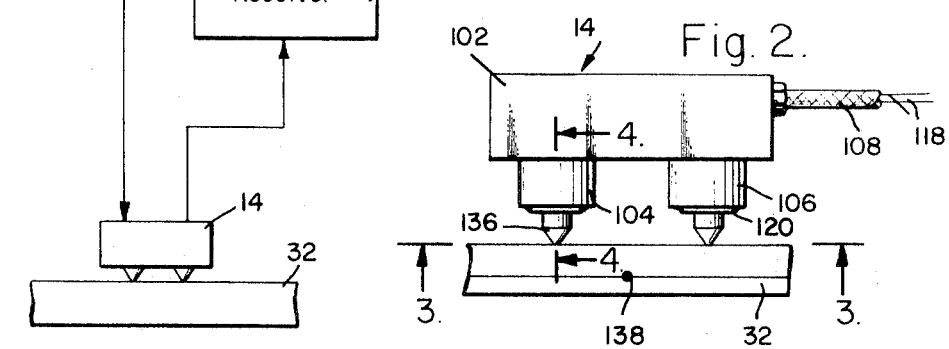
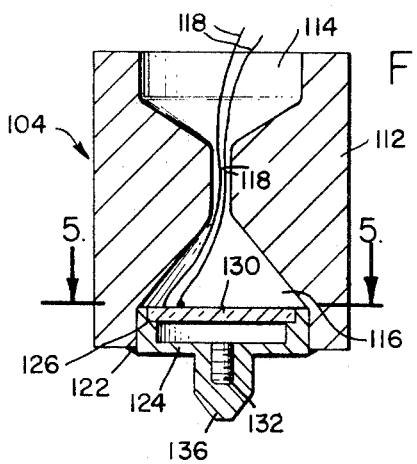
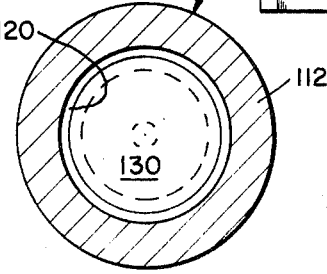
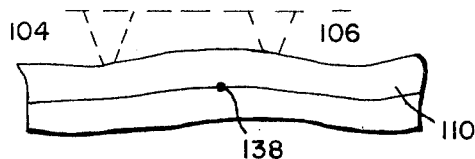
Milton F. Zeutschel,
INVENTOR.
BY.
ATTORNEY.

ULTRASONIC SEARCH UNIT WITH RADIAL MODE MOTION TRANSDUCER

BACKGROUND OF THE INVENTION

1. Field of the Invention

This invention relates to ultrasonic nondestructive testers and more particularly to a point contact search unit acoustically coupled between the ultrasonic tester and the workpiece or the like.

2. Description of the Prior Art

In the prior art there is provided electrical nondestructive test equipment which generates ultrasonic vibrations by use of crystal transducers. The vibrations for the transducer are then sent in the form of an acoustical pulse beam into the workpiece being tested. The beam travels unimpeded through large metallic parts and reflects back from the end surfaces thereof. Any flaw, defect or other discontinuity in the workpiece also causes reflections of the acoustical beam back to the instrument which indicates the location and size of discontinuity on a display such as an oscilloscope. The pulsed vibrations are projected from search unit into the workpiece. A portion of the pulse is reflected back by the flaw or defect and the balance is reflected from the end surfaces. The return energy is displayed on the oscilloscope as vertical spikes. The screen on the oscilloscope exhibits electrical waveforms in the form of spikes of the initial pulse, the defect, and the back and front surface reflections. Spacing of the spike on the scope is in proportion to the distance the beam traveled in the material tested, thus locating the position of any flaw by irregular speed spikes.

Also, such a tester is used to determine the thickness of the workpiece by the regularity of the return back and front surface spikes. If any discrepancies appear in the thickness, it is detected by the relative change in the spikes displayed on the scope.

In these prior art devices, the need for a couplant between the search unit and the workpiece is ever present, due to the fact that ultrasonic energy is greatly attenuated when transmitted through an air medium. This is especially true when using a high frequency required in the proper operation of the prior arts nondestructive testers. Generally the transducers, search units and the workpieces to be tested are immersed into a tank of water in some instances. The search unit then being coupled to the workpiece by the water medium and the search unit is scanned across the workpiece searching for the defects.

Other prior art devices include a water path between the search unit and the workpiece, whereby a steady stream of water couples the sound waves into the workpieces. Yet other types of couplants include the use of glycerin or the like which is first spread across the surface of the workpiece. The search unit is then coupled into the workpiece through this glycerin medium.

All of the above means of coupling the search unit to the workpiece have obvious disadvantages. The water tank medium and the water path devices are difficult and inconvenient to handle, while the glycerin paste technique requires a considerable cleanup after each test. Thus a need is provided for sending sound vibrations to the workpiece by an improved contact search unit which is physically coupled to the workpiece and without the use of any intermediant couplant for the ultrasonic energy.

SUMMARY

Briefly described, the present embodiment comprises an ultrasonic material tester including a means for providing pulses of electrical energy and means for receiving pulses of electrical energy. A display means is provided for displaying signals received by said receiving means. A search unit is provided and is adapted to be coupled to the workpiece under test. The search unit includes a transmit and a receive transducer mounted in a support and spaced a fixed distance apart. Each transducer comprises a housing with an opening in one end thereof. An insert is securely mounted within the opening of the housing. The insert has a relatively thinner diaphragm portion and relatively thicker side portions. A piezoelectric crystal is secured to the thicker portions of the insert and is adapted to vibrate in the radial mode when energized by signals received from the receiving means. A contact member is secured to the diaphragm of the insert and is adapted to be coupled into physical communication with the workpiece.

The mechanical motion of the vibrating contactor causes the workpiece to vibrate, whereby it takes on physical distortions. If there are no flaws, defects or other discontinuities in the workpiece, the signal received by the contactor will show a constant signal to the display means. Should, though, there be a defect, the physical vibration, and hence the physical movement of the workpiece will take on a different characteristic, causing the contactor to receive pulses therein either at a later or earlier time, depending upon the type of defect.

The search units provided in this embodiment have a basic advantage over the prior art in that they operate on a somewhat unique principle. First, there is never a need for a liquid couplant or any other type of couplant between the contactor and the workpiece. Secondly, the contactors do not depend upon ultrasonic energy propagated through a material, but rather depend wholly upon the physical vibrations of the workpiece and the ability to detect changes in the vibrational modes thereon.

DESCRIPTION OF THE DRAWINGS

These and other features and advantages will become more apparent to those skilled in the art when taken into consideration with the following detailed description, wherein like reference numerals indicate like and corresponding parts throughout the several views, and wherein:

FIG. 1 is an electrical block diagram illustrating a nondestructive material tester in accordance with the principles of this invention;

FIG. 2 is a side view of the search unit used with the material tester shown in FIG. 1;

FIG. 3 is a bottom view of the search unit taken along the lines 3-3 of FIG. 2;

FIG. 4 is a section view of one of the transducer units taken along the lines 4-4 of FIG. 2;

FIG. 5 is a section view of the contactor taken along the lines 5-5 of FIG. 4; and FIG. 6 is a semischematic view of the position of a contactor on the workpiece, showing the physical vibrations of the workpiece in an exaggerated form.

DETAILED DESCRIPTION OF THE DRAWINGS

Turning now to the drawing, there is shown a nondestructive test instrument 10, which includes a transmitter 12, which produces a series of intermittently occurring pulses. The transmitter 12 is coupled to a search unit 14, whereby pulses emitted by the transmitter 12 excite a transducer in the search unit 14.

Vibrations from the pulses are received by another transducer in the search unit 14 through a workpiece 32 whereby a similar electrical signal is produced therefrom. This electrical signal is applied to a receiver 18 which in turn is coupled to a vertical deflection generator 20, and thence into the vertical deflection plates of a cathode ray tube 22. The transmitter 12 is driven by pulse generator 24, which also drives a horizontal deflection generator 26, which in turn is coupled to the horizontal deflection plates of the cathode ray tube 22.

The results of the signal received by the receiver 18 and the horizontal deflection generator 26 are displayed in a display 28 on the screen of the cathode ray tube 22. The screen of the oscilloscope 22 reflects the received energy in the form of spikes of the initial pulse. Also shown are spikes indicative of the defects and back reflections from the material under test. Arrival time of the spikes is in proportion to the thickness of the material tested. Also physical displacement in the time of arrival of the signal by the receiver indicate that a flaw or defect is present in the material.

Turning now to FIGS. 2 and 3, there is shown a search unit 14 which comprises a support or mount 102 which has a pair of contact members 104 and 106. A cable 108 is coupled into the search unit 14 and through the support 102, and couples into the contact members 104 and 106. The contact members 104 and 106 of the search unit 100 are in physical contact with a workpiece 32. The support 102 maintains the contact members 104 and 106 a fixed distance from one another.

Referring to FIGS. 4 and 5, there is shown a typical contact member 104 which is comprised of a housing 112 which may be comprised of a relatively dense material such as brass or the like, and has an opening portion 114 in one end thereof, and an opening 116 in the other end thereof. A hole 118 is drilled between the openings 114 and 116 to allow the lead wires 118 to pass therethrough. An insert 120 is tightly secured into the opening 116 and may be secured in place by an epoxy at the areas 122 as shown in FIG. 4.

The insert 120 has a center diaphragm portion 124 whereby the insert is relatively thin in the diaphragm area 124. The insert 120 has a ledged portion 126 around the peripheral edge of the diaphragm 124. For best results the insert 120 is comprised of a lucite or the like, or some material with good tensile properties. The density of the material of the insert 120 may be of some importance in that the heavier the mass, the lower the frequency of the vibration of the diaphragm area 124.

A piezoelectric crystal 130 which may be cylindrically shaped as shown in FIG. 5 is tightly secured to the ledges 126 of the insert 120. The piezoelectric crystal 130 is coupled to the wires 118 whereby the transmitter 12 of FIG. 1 will transmit the electrical pulses to the crystal 130, causing it to vibrate in a mechanical motion. As is well known, most piezoelectric crystals will vibrate in their thickness mode. In some instances though, the material in the transducer 130 may be selected from the type which vibrates in the radial mode, although it should not be limited to this type of material. When the pulses from the transmitter 12 are applied through the wires 118 to the transducer 130, it causes it to vibrate in this radial mode. This in turn causes the diaphragm 124 to vibrate in the axial mode by virtue of the fact that the transducer 130 is securely adhered to the insert 120. The mechanical motion is then transmitted through the insert 120, causing the diaphragm area 124 to vibrate.

A threaded member such as a screw 132 protrudes from the center of the diaphragm area 124. A contactor member 136 is screwed thereon. The contacting member 136 may be cylindrical in shape and may come to a somewhat rounded point. The vibrational movement caused by the transducer 130 is then transferred through the diaphragm 124 onto the contactor 136.

As shown in FIG. 5, the contact member 136 of both contactors 104 and 106 are in physical communication with the front surface of the workpiece 110. In practice, the contact member 104 may be a transmit transducer and the contact member 106 may be the receive transducer, whereby contact member 104 will be coupled through the cable 108 into the transmitter 12 and the receive transducer 106 may be coupled to the receiver 18.

In operation, the workpiece 110 is vibrated by the contactor 104 whereby it takes upon physical distortions set forth in FIG. 6 which shows the workpiece 110 somewhat exaggerated to illustrate the physical movement or vibration thereof. If there are no flaws, defects or other discontinuities in the workpiece 110, the signal received by the receive contact member 106 will show a constant signal on display 28 into the cathode ray tube 22 of FIG. 1. Should, though, there be a defect, as for example a void 138 as shown in FIGS. 2 and 6, the physical vibration, hence the physical movement of the workpiece will take on a different characteristic, causing the contactor 106 to receive pulse signals therein in a later or earlier time depending upon the type of defect. This will be related back to the electronic circuitry 10 in a manner previously described by receive signal being received at different times and thus reflected directly to the cathode ray tube 22.

The search unit 14 described herein has a basic advantage in that it operates on a somewhat unique principle. First of all there is no need for a liquid couplant or any other type of couplant between the contact members 104 and 106 and the workpiece 110. Further, the contact members 104 and 106 do not depend wholly upon the ultrasonic energy being reflected through material and back to a second transducer as is now the case in the prior art devices. This particular search unit 14 depends wholly upon the physical vibration of the workpiece and detects changes in the vibrational modes thereof. A material tester employing these principles is highly adapted to be used in honeycomb material, particle board, or plywood structures. Any changes in the density that cause the physical vibrations to change in any manner will be reflected to the receive contactor 106.

Another example of the utility of this transducer is that some honeycomb materials have definite characteristics. These characteristics in structure comprise skirts on the vertical structure which are all facing the same direction. It is sometimes desirable to know the exact direction of the skirts within the honeycomb structure. If the receive contactor 104 and the transmit contactor 106 are in one position in alignment with the skirts, a definite signal will be recognized in the output pattern. If the search unit 14 is positioned in a second direction, a change in the pattern is indicated. Thus, the direction of the skirts within the honeycomb structure can be easily determined.

The contactor 136 can be easily removed from the threaded member 132 and a new contact member can be replaced therewith. This is highly desirable if a contactor 136 receives a considerable amount of use and the rounded portions thereon become worn.

Having thus described but one preferred embodiment of this invention, what I claim is:

1. A search unit comprising:
    a relatively dense housing having an opening in one end thereof;
    an insert physically mounted within the opening of said housing and including a relatively thinner diaphragm portion in physical communication therewith;
    a radial mode motion transducer being disposed in physical communication with said insert whereby radial mode motions of said transducers being communicated to said diaphragm through said inert; and
    means for converting said radial mode motion of said transducer to axial mode motion in said diaphragm portion for being coupled into the workpiece.

2. The search unit as defined in claim 1 and further comprising a contactor being connected to the diaphragm portion of said insert.

3. The search unit as defined in claim 1 wherein said transducer is a piezoelectric crystal.

4. A search unit for inspecting a workpiece comprising:
    a support;
    a pair of relatively dense housings being mounted in said support and being spaced apart a fixed distance thereby, each said housing having an opening therein;
    an insert physically mounted within the opening of each said housing and each said insert including a relatively thinner diaphragm portion in physical communication therewith;
    a radial mode motion transducer being disposed in physical communication with said insert in each said housing whereby radial mode motions to and from said transducer being communicated to and from said diaphragm through said insert; and
    means in each said housing for converting said radial mode motion of said transducer into axial mode motion in said diaphragm portion for being coupled into the workpiece.

5. The search unit as defined in claim 4 and further comprising a contactor being connected to the diaphragm portion of each said insert and being adapted to be coupled to said workpiece for communicating vibrations between said diaphragms through said workpiece.

6. The search unit as defined in claim 1 wherein said transducer is a piezoelectric crystal.

7. A nondestructive material tester for inspecting workpieces comprising:
   first means for providing pulses of electrical energy;
   second means for receiving pulses of electrical energy;
   display means responsive to said receiving means for displaying signals received thereby;
   an ultrasonic search unit including:
      a housing of relatively dense material having a hollow opening in at least one end thereof;
      an insert being shaped to be inserted into said housing and being in physical communication therewith, said insert including a ledge formed around the periphery of said insert and protruding into the opening in said housing, a diaphragm having a flexible position extending across one end of said insert, and forming an integral portion of said insert; and
      a transducer crystal physically constructed to vibrate in the physical mode and being disposed across the ledge of said insert and into said housing and being in physical communication therewith whereby vibrations of said crystal being converted to an axial mode vibration and communicated to said diaphragm.

8. The nondestructive material tester as defined in claim 7 wherein the transducer in said search unit is comprised of a piezoelectric crystal.

9. The nondestructive test system as defined in claim 7 and further comprising a contactor being connected to the diaphragm portion of said insert.

10. A contact search unit for use in a nondestructive material tester including:
    a housing of relatively dense material having a hollow opening in at least one end thereof;
    an insert being shaped to be inserted into said housing and being in physical communication therewith, said insert including a ledge formed around the periphery of said insert and protruding into the opening in said housing, a diaphragm having a flexible position extending across one end of said insert, and forming an integral portion of said insert; and
    a transducer crystal being physically constructed to vibrate in the physical mode and being disposed across the ledge of said insert and into said housing and being in physical communication therewith whereby vibrations of said crystal being converted to an axial mode vibration and communicated to said diaphragm.

11. The contact search unit as defined in claim 10 and further including a protruding contact member being affixed to the flexible portion of said diaphragm and being adapted to engage the workpiece to vibrate with said diaphragm and transmits the vibrations into and receives the vibrations from the workpiece.